United States Patent [19]

Takehira

[11] Patent Number: 5,762,558
[45] Date of Patent: Jun. 9, 1998

[54] DAMPER DISC ASSEMBY AND BALANCE WEIGHT THEREFOR

[75] Inventor: Yasushi Takehira, Kobe, Japan

[73] Assignee: Exedy Corporation, Osaka, Japan

[21] Appl. No.: 792,263

[22] Filed: Jan. 31, 1997

[30] Foreign Application Priority Data

Feb. 16, 1996 [JP] Japan .................... 8-029549

[51] Int. Cl.⁶ ........................................... F16D 3/12
[52] U.S. Cl. ...................... 464/68; 74/573 R; 192/212
[58] Field of Search ..................... 464/64, 66, 68, 464/180; 192/110 R, 212; 74/573 R, 574

[56] References Cited

U.S. PATENT DOCUMENTS

| | | |
|---|---|---|
| 4,588,062 | 5/1986 | Caray et al. ............... 192/212 X |
| 4,591,041 | 5/1986 | Valier ....................... 74/573 R X |
| 4,778,040 | 10/1988 | Kabayama ................. 192/110 R |
| 4,887,989 | 12/1989 | Kerecman ...................... 464/180 |
| 5,447,218 | 9/1995 | Tauvron ................... 74/573 R X |

*Primary Examiner*—Eileen A. Dunn
*Attorney, Agent, or Firm*—Shinjyu An Intellectual Property Firm

[57] ABSTRACT

A balance weight (20) is fixed to a damper disc assembly (1) together with a stop pin (10) and is used for balancing an imbalance in the rotational operation of the damper disc assembly (1). The balance weight (20) includes a hole (20a) through which the head portion of the stop pin (10) extends and recesses (20b) which engages a caulked portion of the stop pin (10), the recess (20b) formed on the peripheral portion of the hole (20a) therein.

2 Claims, 5 Drawing Sheets

5,762,558

DAMPER DISC ASSEMBY AND BALANCE WEIGHT THEREFOR

BACKGROUND OF THE INVENTION

1. Field of the Invention

The present invention relates to a damper disc assembly and a balance weight for adjusting the imbalance in rotational operation thereof.

2. Description of the Related Art

A clutch disc assembly for use in, for example, an automotive vehicle is typically provided with a clutch plate and a retaining plate as power input plates (hereinafter referred to as power input plates), a power output hub integrally formed with a flange on its outer circumference, torsion springs for elastically connecting the power input plates and the power output hub in the circumferential direction, and a hysteresis torque generating mechanism disposed between the power input plates and the power output hub. The relative displacement between the power input plates and the flange is limited within the predetermined angle by stop pins.

In this type of damper disc assembly, there is often an imbalance in the damper disc assembly during rotational operation caused by minor imperfections or flaws the structural components or occasionally by slight imperfections generated during assembling of the damper discs. Such imperfections and flaws usually do not have any structural significance with regard to the damper disc assembly's main function, i.e. transmitting torque. However, imbalances in a damper disc assembly may be the source of undesirable vibrations in the drive train of an automobile. The imbalance in rotational operation causes the vibrations in the drive power transmitting system and may cause unwanted or abnormal noise. Hence it is desirable to correct or somehow adjust for any imbalances.

SUMMARY OF THE INVENTION

One object of the present invention is to correct for imbalance in a damper disc assembly.

Another object of the present invention is to fix a balance weight securely to a damper disc assembly.

In accordance with one embodiment of the present invention, a balance weight for use in a damper disc assembly includes a weight body formed with a hole extending therethrough, the hole configured to receive a pin, the weight body further formed with a recess concentric with the hole shaped to retain a head portion of the pin when the pin is caulked into position within the recess, the pin being one of several structural component of a damper disc assembly.

Preferably, the weight body has a generally flat rectangular shape and the weight body is formed with an engaging portion which extends from a lateral side therefrom, the engaging portion being generally perpendicular to the weight body, the engaging portion being configured to extend into a hole formed in a portion of the damper disc assembly.

In accordance with another aspect of the present invention, a damper disc assembly includes a pair of power input plates, a hub configured for limited relative rotation with respect to the power input plates, the hub formed with a radially extending flange, the flange extending between the power input plates. An elastic coupling element is operably disposed between the flange and the power input plates elastically coupling the power input element and the power output element in the circumferential direction. A stop pin extends between the power input plates, the stop pin rigidly fixing the power input plates to one another. The stop pin further extending through a cutaway formed in the flange, the stop pin and the cutaway being configured to limit relative rotary displacement between the power input plate and the hub. A balance weight is fixed to one of the power input plates via the stop pin, wherein the balance weight is formed with a hole through which a portion of the pin extends and the balance weight is also formed with a recess about the hole for engaging a caulked portion of the pin.

These and other objects, features, aspects and advantages of the present invention will become more fully apparent from the following detailed description of the present invention when taken in conjunction with the accompanying drawings where like reference numerals denote corresponding parts throughout, in which:

DESCRIPTION OF THE PREFERRED EMBODIMENTS

Figure 1:
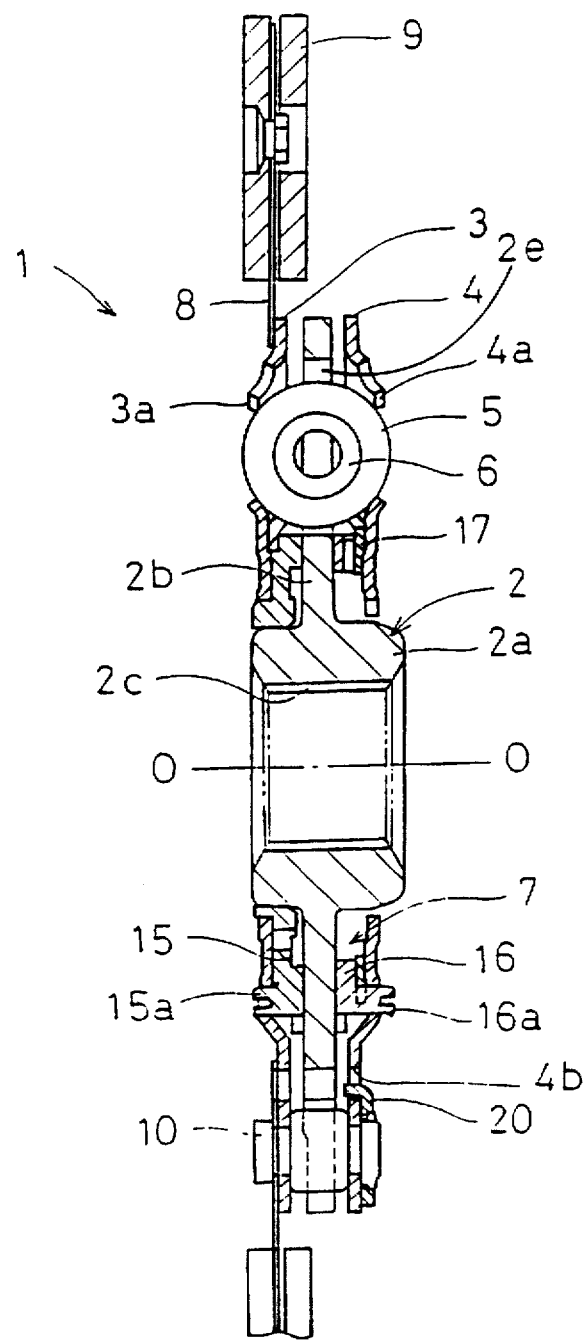
FIG. 1 is a fragmentary, side sectional view of a clutch disc assembly having a hysteresis torque generating mechanism and a balance weight in accordance with one embodiment of the present invention.

A clutch disc assembly 1 in accordance with one embodiment of the present invention is shown in FIG. 1. The clutch disc assembly 1 is used to selectively transmit torque from an engine (not shown) located on the left side of FIG. 1 to a transmission (not shown) located on the right side of FIG. 1. The left side of FIG. 1 will hereinafter be referred to as the engine side and the right side of FIG. 1 will be referred to as the transmission side. In FIG. 1, line O—O designates a rotary axis which the clutch disc assembly 1 is configured to rotate about.

The clutch disc assembly 1 includes a hub 2 which serves as a power output element, a clutch disc 3 and a retaining plate 4 which together serve as power input elements, small torsion springs 6 and large torsion springs 5 for elastically connecting the clutch disc 3 and the retaining plate 4 and the hub 2 in the circumferential direction, a hysteresis torque generating mechanism 7 to produce the predetermined amount of the friction force upon the relative rotation between the plates 3 and 4 and the hub 2, and frictional elements 9 fixed to the clutch plate 3 through the cushioning plates 8.

Figure 2:
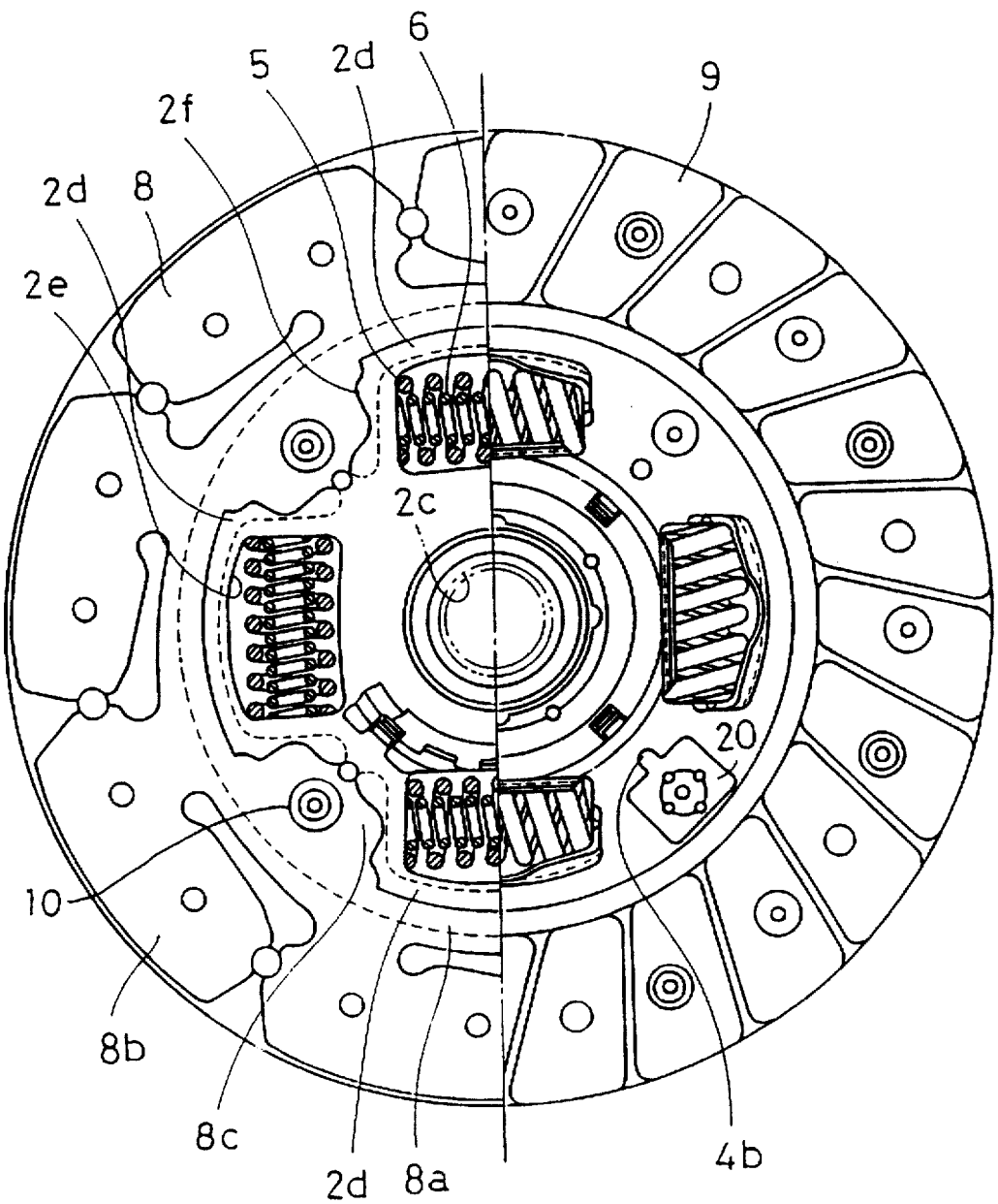
FIG. 2 is a part cutaway, part elevational view of the clutch disc assembly depicted in FIG. 1.

The hub 2 which is connectable to a shaft (not shown) of the transmission is disposed at the center of the clutch disc assembly 1. The hub 2 includes a cylindrical boss 2a which axially extends and a flange portion 2b integral with the outer circumference of the boss 2a. The spline hole 2c which is spline-engagable with the shaft of the transmission is formed on the inner circumferential side of the boss 2a. As shown in FIG. 2, four extending portions 2d are formed at regular intervals in the circumferential direction on the outer circumference of the flange portion 2b. One window 2e is formed in each of the extending portion 2d for accommodating the large torsion spring 5 and the small torsion spring 6.

The clutch plate 3 and the retaining plate 4 are substantially disc-like elements and are disposed on the outer peripheral side of the boss 2a of the hub 2 so as to be rotatable relative to each other. The plates 3 and 4 as well as cushioning plates 8 are fixed to each other at their outer peripheral portions by a plurality of stop pins 10. Each stop pin 10 passes through a cutaway 2f defined between adjacent extending portions 2d formed in the flange portion 2b of the hub 2. A predetermined gap is provided between the stop pin 10 and the cutaway 2f in the circumferential direction, so that the plates 3, 4 and the hub 2 are rotatable relative to each other by a limited, predetermined displacement angle.

The cushioning plate 8 includes an annular portion 8a which annularly extends and a plurality of cushioning portions 8b extending from the annular portion 8a to the outer peripheral side thereof. A portion 8c of the annular portion 8a, which is projected in the inner peripheral side, is fixed to the clutch plate 3 by stop pins 10.

The clutch plate 3 and the retaining plate 4, as shown in FIG. 1, are provided with window holes 3a and 4a at the positions corresponding to the window holes 2e of the hub 2, respectively, as shown in FIG. 1. The torsion springs 5 and 6 are disposed within the window holes 3a and 4a.

Figure 3:
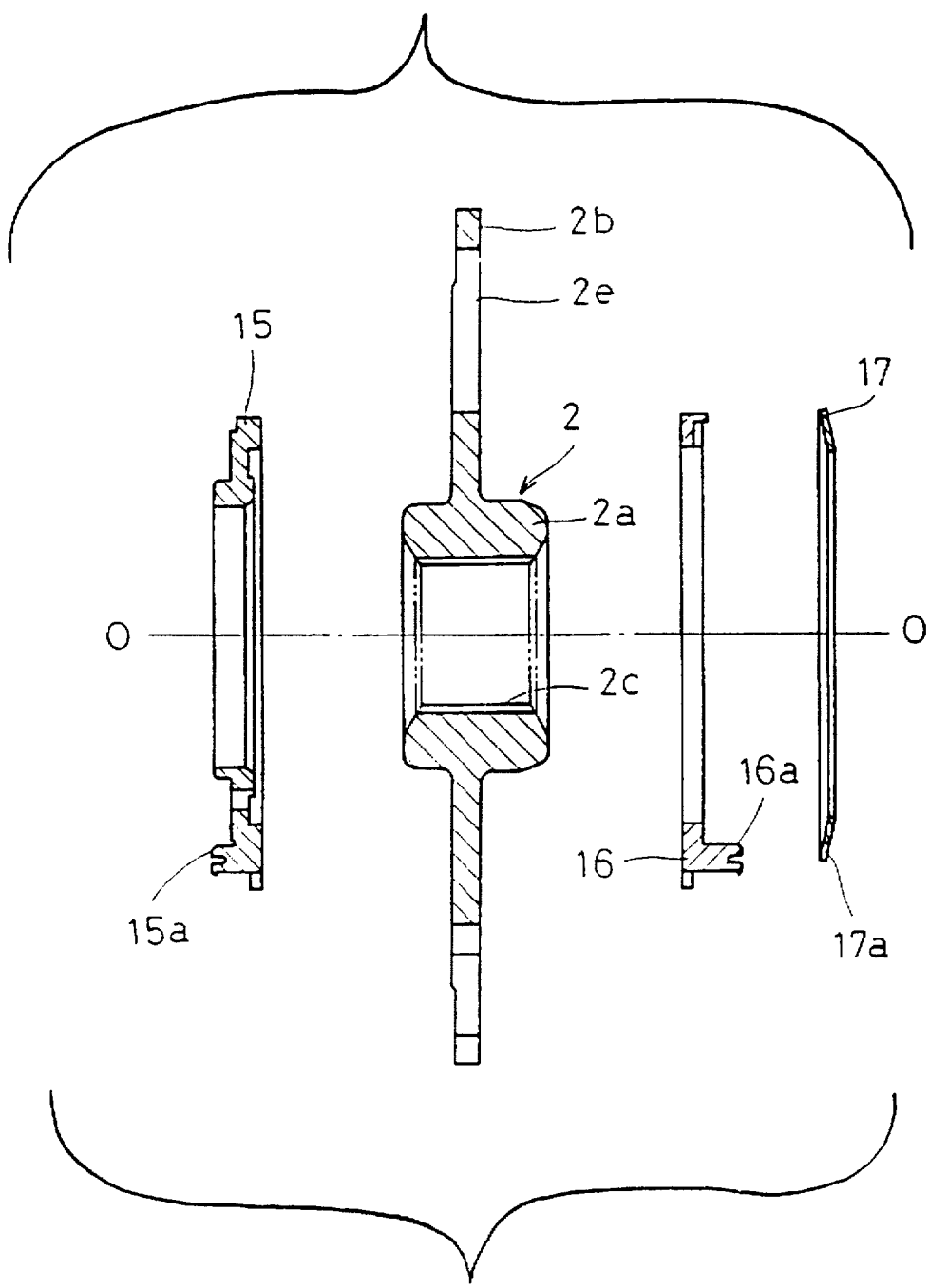
FIG. 3 is a cross sectional, exploded view showing the structure of the hysteresis torque generating mechanism of the clutch disc assembly depicted in FIGS. 1 and 2, on a slightly enlarged scale, with other portions of the clutch disc assembly omitted for clarity.

The hysteresis torque generating mechanism 7, as shown in FIGS. 1 and 3 (the exploded view), is disposed between the inner peripheral portion of the clutch plate 3 and the inner peripheral portion of the retaining plate 4 in the axial direction as well as on the outer peripheral sides of the boss 2a. The members in the hysteresis torque generating mechanism 7 include a first bush 15 disposed between the clutch plate 3 and the flange portion 2b of the hub 2, a second bush 16 disposed between the flange portion 2b and the retaining plate 4, and a conical spring 17 for pressing each of the bushes 15 and 16. Each of the bushes 15 and 16 respectively includes clip portions 15a and 16a which are configured to engage corresponding holes formed in the clutch plate 3 and the retaining plate 4. A plurality of notches 17a through which the clip portions 16a of the second bush 16 pass are formed on the outer periphery of the conical spring 17.

Figure 4:
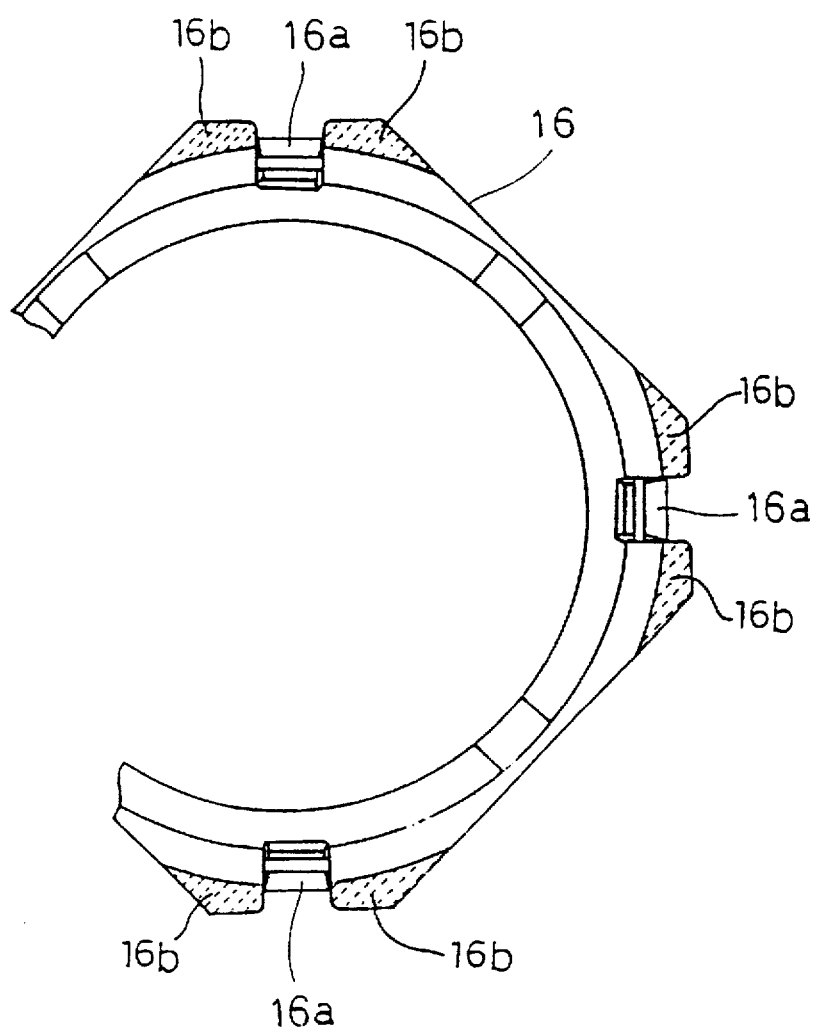
FIG. 4 is a fragmentary view of a bush of the hysteresis torque generating mechanism depicted in FIG. 3, on a slightly enlarged scale.

In the second bush 16, as shown in FIG. 4, outer circumferential portions 16b, which are adjacent to the clip portion 16a(the area shown by the dotted slant line), are formed so as to extend on the outer peripheral side of the second bush 16. Portions of conventional, prior art friction bushings that might be considered as flash or excess material, are cut off during the manufacturing process of the conventional friction bush structures. However, in the present invention, the portions 16b are purposefully included to increase the contact or sliding area of the second bush 16 with respect to the flange portion 2b in the present invention. As a result, the surface pressure per square unit of measurement becomes lower and thus the wear due to friction is minimized. Although not depicted, the first bush 15 is configured with similar outer circumferential portions which increase the surface area of the first bush 15 in contact with the flange portion 2b.

In the clutch disc assembly described above, there may be an imbalance in rotational operation which is caused by slight flaws in some or all of the structural components of the clutch disc assembly or may be the result of the assembling process. These flaws have little structural significance in that they will not impair the ability of the clutch disc assembly to transmit torque. Therefore the imbalance can be corrected or counterbalanced by the addition of a balance weight 20.

Figure 5:
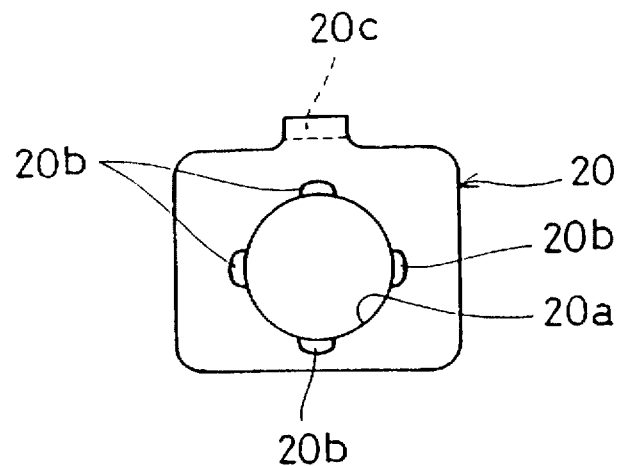
FIG. 5 is a front elevation of the balance weight shown removed from the damper disc assembly depicted in FIG. 1.
Figure 6:
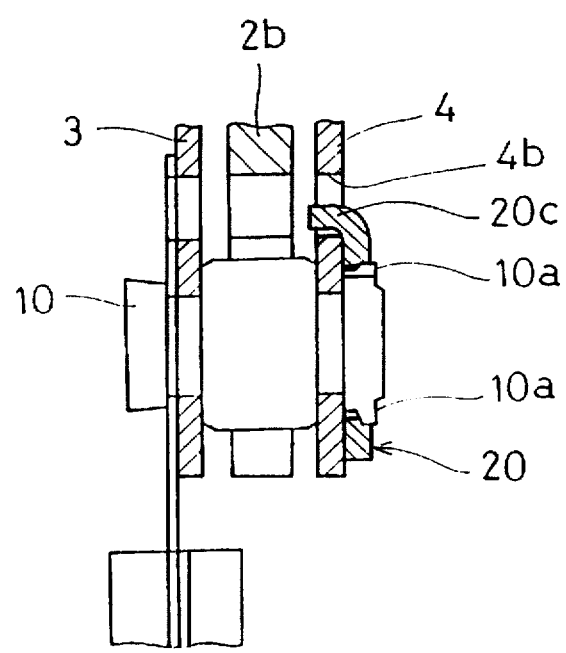
FIG. 6 is a fragmentary, sectional view of a portion of the clutch disc assembly depicted in FIG. 1, on a slightly enlarged scale.

The balance weight 20, as shown in FIG. 5 (showing the balance weight removed from the clutch disc assembly 1) and FIG. 6 (showing the balance weight attached to the clutch disc assembly 1), on a slightly enlarged scale, is a substantially rectangular plate element. The balance weight 20 is formed with a hole 20a through which the stop pin 10 passes in its central portion. Four recesses 20b are formed at regular intervals in the circumferential direction on the outer peripheral portion of the hole 20a in the balance weight 20. The recesses 20b may be formed, for example, by coining. Further, the balance weight 20 includes an engaging portion 20c which is formed on a portion of its outer periphery and is perpendicularly folded. The size of the engaging portion 20c is determined so as to pass through the hole 4b for assembling (see FIGS. 1, 2 and 6) formed in the retaining plate 4.

In the clutch disc assembly 1, when the frictional members 9 come into pressing contact with a flywheel (not shown) on the engine side, the torque from the flywheel on the engine side is transmitted to the clutch plate 3 and the retaining plate 4. This torque is transmitted to the hub 2 through the torsion springs 5 and 6, and is further outputed to the shaft (not shown) on the transmission side.

Transmitting the twist vibration from a flywheel (not shown) on the engine side to the clutch disc assembly 1 brings about the regular relative rotation between the plates 3, 4 and the hub 2. At this time, the hysteresis torque generating mechanism 7 starts to run and attenuate the vibration.

When the adjustment for the imbalance is carried out after assembling the clutch disc assembly 1, the clutch disc assembly is installed in a balancing device to determine if an imbalance is present. If so, the weight of a balance weight is determined along with the direction/ position of the balance weight to be mounted. The balance weight of the suitable weight is selected and is mounted to the retaining plate by stop pin 10 in the predetermined direction/position in accordance with the determination made by use of the balancing device. At this time, the engaging portion 20c of the balance weight 20 is inserted into the hole 4b for assembling. Four head portions of the stop pin 10 are then caulking, and this allows the caulked portions 10a(see FIG. 6) of the stop pin 10 to engage with the recesses 20b of the balance weight 20, so that the balance weight 20 is securely fixed.

ADVANTAGES OF THE INVENTION

As described above, in accordance with the balance weight and the damper disc assembly of the present invention, the caulked portions of the pin are engaged with the recesses of the balance weight. As a result, the caulking strength is improved.

When the balance weight is provided with an engaging portion and the engaging portion is engaged with a piercing hole formed in the damper disc assembly, the caulking strength can be further improved.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A balance weight for use in a damper disc assembly, the balance weight comprising:

a weight body formed with a hole extending therethrough, said hole configured to receive a pin, said weight body further formed with a recess concentric with said hole shaped to retain a head portion of the pin when the pin is caulked into position within said recess, the pin being one of several structural component of a damper disc assembly; and wherein said weight body has a generally flat rectangular shape and said weight body is formed with an engaging portion which extends from a lateral side therefrom, said engaging portion being generally perpendicular to said weight body, said engaging portion being configured to extend into a hole formed in a portion of the damper disc assembly such that pin and said engaging portion restrict rotation and lateral movement of said weight body.

2. A damper disc assembly comprising:

a pair of power input plates;

a hub configured for limited relative rotation with respect to said power input plates, said hub formed with a radially extending flange, said flange extending between said power input plates;

an elastic coupling element operably disposed between said flange and said power input plates elastically coupling said power input element and said power output element in the circumferential direction;

a stop pin extending between said power input plates, said stop pin rigidly fixing said power input plates to one another, said stop pin extending through a cutaway formed in said flange, said stop pin and said cutaway configured to limit relative rotary displacement between said power input plate and said hub; and a balance weight fixed to one of said power input plates via said stop pin, wherein said balance weight is formed with a hole through which a portion of said stop pin extends and said balance weight is also formed with a recess about said hole for engaging a caulked portion of said stop pin; and wherein said balance weight has a generally flat rectangular shape an said balance weight is formed with an engaging portion which extends from a lateral side therefrom, said engaging portion being generally perpendicular to said balance weight, said engaging portion being configured to extend into a hole formed in a portion of one of said power input plates such that said stop pin and said engaging portion restrict rotation and lateral movement of said balance weight.

* * * * *